US006932995B2

(12) United States Patent
Schevers et al.

(10) Patent No.: US 6,932,995 B2
(45) Date of Patent: Aug. 23, 2005

(54) METHOD FOR PRODUCING BULK CONFECTIONERY

(75) Inventors: Martinus Josephus Schevers, Schijndel (NL); Rob Cornelis Verhagen, Burnham (GB); Guy Gaston Louis Joseph Labbe, Moder (FR); Michel Jacques Charles Flambeau, Strasbourg (FR); Magali Leherle, Chester (GB)

(73) Assignee: Masterfoods, Saint-Denis del l'Hotel (FR)

( * ) Notice: Subject to any disclaimer, the term of this patent is extended or adjusted under 35 U.S.C. 154(b) by 78 days.

(21) Appl. No.: 10/258,277

(22) PCT Filed: Apr. 27, 2001

(86) PCT No.: PCT/FR01/01305

§ 371 (c)(1),
(2), (4) Date: Jan. 31, 2003

(87) PCT Pub. No.: WO01/82717

PCT Pub. Date: Nov. 8, 2001

(65) Prior Publication Data

US 2003/0148007 A1 Aug. 7, 2003

(30) Foreign Application Priority Data

Apr. 28, 2000 (FR) .......................................... 00 05490

(51) Int. Cl.$^7$ ................................................. A23G 3/00
(52) U.S. Cl. ....................... 426/103; 426/303; 426/306; 426/307; 426/660
(58) Field of Search ................................ 426/660, 103, 426/303, 306, 307

(56) References Cited

U.S. PATENT DOCUMENTS

| 4,289,790 A | | 9/1981 | Bruelle ........................ 426/93 |
| 4,394,392 A | * | 7/1983 | Tresser ....................... 426/101 |
| 4,663,175 A | | 5/1987 | Werner et al. .............. 426/289 |
| 4,837,042 A | * | 6/1989 | Vajda et al. ................ 426/615 |
| 4,961,943 A | * | 10/1990 | Blanthorn et al. .......... 426/102 |
| 5,004,620 A | * | 4/1991 | Straight et al. ............. 426/304 |
| 5,147,669 A | * | 9/1992 | Crothers ..................... 426/94 |
| 5,292,536 A | * | 3/1994 | Sato et al. ..................... 426/5 |
| 5,326,505 A | * | 7/1994 | Adams et al. ............. 264/1.36 |
| 5,424,085 A | | 6/1995 | Hsieh et al. ................ 426/289 |
| 5,876,775 A | * | 3/1999 | Behnke et al. ............. 426/302 |
| 6,207,207 B1 | * | 3/2001 | Belzowski et al. ......... 426/303 |
| 6,364,948 B1 | * | 4/2002 | Austin et al. ................ 118/58 |
| 6,555,150 B1 | * | 4/2003 | Belzowski et al. ......... 426/103 |

FOREIGN PATENT DOCUMENTS

| FR | 2 508 280 | 12/1982 | ............ A23G/3/00 |
| FR | 2 689 730 | 10/1993 | ............ A23G/1/00 |
| FR | 2 697 974 | 5/1994 | ............ A23G/3/00 |
| FR | 2 731 876 | 9/1996 | ............ A23G/1/00 |
| JP | 63 226250 | 9/1988 | ............ A23L/1/00 |

OTHER PUBLICATIONS

Truffles Recipe courtesy of Sherry Yard, The Secrets of Baking, Houghton Mifflin, 2003.*

* cited by examiner

*Primary Examiner*—N. Bhat
(74) *Attorney, Agent, or Firm*—Fitzpatrick Cella Harper & Scinto

(57) ABSTRACT

The invention concerns a method for making a chocolate-flavored confectionery which consists in coating at least a particle with alternative layers of fats and powders comprising cocoa.

18 Claims, No Drawings

METHOD FOR PRODUCING BULK CONFECTIONERY

TECHNICAL FIELD

The invention relates to confectionery products containing chocolate, that include coated particles.

BACKGROUND OF THE INVENTION

Chocolate-containing sweets sold loose such as those sold under the M&M's® brand are known. These are chocolate-coated peanuts carrying an outer colored sugar-based layer. Such sweets are made by coating the peanuts with a liquid chocolate preparation and then solidify the thus formed layer. After this, the outer sugar-based layer is applied and polished.

However, this method suffers from some imperfections. Thus, the sweets obtained are relatively hard to the tooth. Now, if it is desired to incorporate them into a preparation such as an ice-cream or biscuit, the difference in hardness between the sweet and the remainder of the preparation produces a sensation that consumers find disagreeable.

Further, this method proves difficult to apply when coating central cores smaller than peanuts. Applying liquid chocolate on to small, lightweight particles is a delicate operation as the coating composition is required to have certain special characteristics as regards viscosity. This now means the liquid chocolate composition has to be changed leading to a product which is not satisfactory to the consumer or even not in line with legislation on chocolate products.

We could add that this solution consisting in breaking up M&M's® sweets to reduce their size produces an unacceptable aesthetic result as this is not the same thing as the same sweets scaled down.

One aim of the invention is to provide a method for preparing chocolate sweets of the same type as the known ones, but which are less hard and optionally of smaller size.

BRIEF SUMMARY OF THE INVENTION

To achieve this aim, according to the invention, a method is provided for preparing a chocolate confectionery product in which at least one particle is coated by alternating layers of liquid fat and layers of powder comprising cocoa.

Thus, each fat layer acts as a binder for the layer of powder subsequently applied and forms therewith a layer of chocolate. It is noted that the confectionery product obtained is less hard than known sweets. It consequently gives a more pleasant sensation when incorporated into a preparation such as a biscuit, an ice-cream or a yoghurt. Further, the method is particularly well adapted to the coating of very small size particles such as peanuts splinters, and without coming into conflict with legislation on chocolate products.

The invention may further have at least one of the following characteristics:

the particle is of the family of nuts and hazelnuts;
the particle is a fraction of a nut or hazelnut;
the particle is a peanut;
the particle has a major diameter less than or equal to 5 mm, and preferably less than or equal to 3.5 mm;
the fatty matter contains cocoa butter;
it comprises a step of cooling the coated particle;
coating is carried out followed by cooling of the particle, after which coating is again performed;
after coating with fatty matter and powder, the particle is coated with a sugar containing solution, preferably colored, and/or
the confectionery product is a loose product comprising a multitude of said coated particles.

A chocolate-containing confectionery product produced by the above method is also provided.

The invention also provides a food product comprising confectionery products distributed within the product, characterised in that the confectionery products have been produced by the above method.

The food product can have one or more of the following characteristics:

the product contains a liquid or pasty substance;
it contains an ice-cream receiving the confectionery products, and/or
it contains a milk substance receiving the confectionery products.

Further characteristics and advantages of the invention will become more clear from the description that follows of one preferred embodiment of the invention and some alternative embodiments provided by way of non limiting example.

DETAILED DESCRIPTION OF THE INVENTION

In the preferred embodiment of the method of the invention, peanut splinters are used for constituting the hard particles or centers. More generally, any element whatsoever from the family of nuts could be used (walnuts, pecan nuts, hazelnuts, brazil nuts, almonds, cashew nuts, etc), whole or in the form of fragments.

Such fragments, resulting from crushing of peanuts will preferably have a major diameter comprised between 1.5 and 3.5 mm. The shape is, obviously, random. The centers will nevertheless preferably have been screened to make their size homogeneous. Once coated and polished, the confectionery product will have a major diameter comprised between 2 and 5 mm.

The center could also be formed from any other element, preferably crisp, for example a fragment of a biscuit.

The centers can be splinters of peanut or another nut which, after being broken up, have been covered with a sugary solution and then dried.

Splinters originating from nuts roasted dry or roasted in association with a fatty product can be used.

During the process, the centers, provided loose in a suitable recipient, are coated with alternating layers of fatty liquid and a powder comprising cocoa. For this, the liquid and powder are alternately sprayed onto the centers. Thus, successively, a layer of fatty liquid, a layer of powder, a layer of fatty liquid, a layer of powder and so on are applied. The layer of fatty liquid incorporates the cocoa powder, and acts as a binder for it. It allows the powder to become fixed on the particle to be coated.

The cocoa powder can, for example, comprise, among other things, icing sugar, skimmed milk powder, cream and coca in powder form. The cocoa powder can for example have the following composition:

icing sugar: 54%
skimmed milk powder: 29%
cocoa powder: 14%
additives: 3%.

Regarding the fatty liquid, this can have a 100% cocoa butter composition.

After each application of the powder layer, cold air is directed onto the particles in order to solidify the fatty liquid layer, preferably only after 4 or 5 applications of fatty liquid.

Alternating fatty liquid layers and powder layers leads to a product having the desired chocolate composition, for example, a composition very close to that of the M&M's brand sweets, but having a fairly soft texture. As many layers as are necessary to obtain the desired thickness are applied. Product hardness, which is fairly moderate, stays the same regardless of whether the product is consumed cold, frozen or at room temperature.

The powder composition can readily be adapted as a function of consumer preferences or to obtain a particular flavour or product appearance. Other fats can be added to the cocoa butter or even form the fatty liquid, without cocoa butter. To a certain extent, the performance of the process according to the invention is not changed by a modification in the fatty liquid, cocoa powder composition or chocolate rheology.

The method of the invention allows chocolate layers to be formed on crisp centers which are small and lightweight, and which, otherwise, would be difficult to coat with a standard viscous chocolate (typically having a Casson viscosity comprised between 6 and 12 Pa). A conventional coating technique using liquid chocolate would lead to the centers agglomerating with each other, which would prevent the process operating correctly.

After the particles have been coated with layers of fatty liquid and cocoa powder, they are coated with one or several sugar layers.

In order to provide hard sugar outer shells, a colored sugar solution is sprayed onto the particles, followed by blowing of dry air in order to solidify the sugar syrup layer.

Following this, the particles are polished to give them a shiny and smooth appearance.

Under the preferred conditions of implementation, the product is prepared in a drum with a speed of rotation of 23 rpm. Drum volume is 500 liters. The fatty liquid is heated to a temperature comprised between 40 and 50° C. Cooling air is blown onto the particles at a temperature of 13° C. but a lower temperature, for example comprised between 5 and 10° C., can be envisaged and allows the duration of blowing to be reduced. The quantity of centers in the recipient is for example 75 kg. Once coated, the product has a total mass of 225 kg, formed by loose granules.

Coating is advantageously performed in a recipient the inner faces of which in contact with the product are covered with rubber: this improves the appearance of the product.

Printing various signs such as a logo, a brand name or product name on the particles can be envisaged.

A provision can be made to incorporate the loose confectionery products of the invention into or onto various food products such as a frozen product (ice-cream or a sorbet), yoghurt, biscuit, etc.

The product according to the invention has, when it is eaten, the taste of chocolate and the peanut which was coated.

In the example just discussed, the confectionery product is very close to the conventional M&M's® sweets in terms of recipe, ingredients, appearance and taste, but is of much smaller size.

What is claimed is:

1. A method for preparing a chocolate-containing confectionery product, wherein at least one particle is coated with chocolate formed by alternating layers consisting essentially of fatty matter layers containing cocoa butter with layers of powder containing cocoa on the at least one particle.

2. The method for preparing a chocolate-containing confectionery product according to claim 1, wherein the particle is of the family of nuts and hazelnuts.

3. The method for preparing a chocolate-containing confectionery product according to claim 1, wherein the particle is a fraction of a nut or hazelnut.

4. The method for preparing a chocolate-containing confectionery product according claim 1, wherein the particle is a peanut.

5. The method for preparing a chocolate-containing confectionery product according to claim 1, wherein the particle has a major diameter less than or equal to 5 mm.

6. The method for preparing a chocolate-containing confectionery product according to claim 1, wherein it comprises a step of cooling the coated particle.

7. The method for preparing a chocolate-containing confectionery product according to claim 1, wherein coating is carried out followed by cooling of the particle, after which coating is again performed.

8. The method for preparing a chocolate-containing confectionery product according to claim 7, wherein the cooling of the particle comprises blowing air onto the particle, the air being at a temperature equal to or lower than 13° C.

9. The method for preparing a chocolate-containing confectionery product according to claim 7, wherein the cooling of the particle comprises blowing air onto the particle, the air being at a temperature between 5° C. and 13° C.

10. The method for preparing a chocolate-containing confectionery product according to claim 1, wherein, after coating with fatty matter and powder, the particle is coated with sugar containing solution.

11. The method for preparing a chocolate-containing confectionery product according to claim 1, wherein the confectionery product is a loose product comprising a multitude of said coated particles.

12. The method for preparing a chocolate-containing confectionery product according to claim 1, wherein the particle has a major diameter less than or equal to 3.5 mm.

13. The method for preparing a chocolate-containing confectionery product according to claim 1, wherein, after coating with fatty matter and powder, the particle is coated with a colored sugar containing solution.

14. A chocolate-containing confectionery product wherein it is produced by a method wherein at least one particle is coated with chocolate formed by alternating layers consisting essentially of fatty matter layers containing cocoa butter with layers of powder containing cocoa on the at least one particle.

15. A food product comprising confectionery products distributed within the product, wherein the confectionery products have been produced by a method wherein at least one particle is coated with chocolate formed by alternating layers consisting essentially of fatty matter layers containing cocoa butter with layers of powder containing cocoa on the at least one particle.

16. The food product according to claim 15, wherein the product contains a liquid or pasty substance.

17. The food product according to one of claim 15 or 16, wherein it contains an ice-cream receiving the confectionery products.

18. The food product according to one of claim 15 or 16, wherein it contains a milk substance receiving the confectionery products.

* * * * *